(12) United States Patent
French et al.

(10) Patent No.: US 8,352,179 B2
(45) **Date of Patent: *Jan. 8, 2013**

(54) HUMAN EMOTION METRICS FOR NAVIGATION PLANS AND MAPS

(75) Inventors: Paul B. French, Cork (IE); Eric Thiebaut-George, Cork (IE); Niall Jude Lucey, Cork (IE); Edith Helen Stern, Somers, NY (US); Michael Truss, Cork (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,481

(22) Filed: Mar. 16, 2012

(65) Prior Publication Data

US 2012/0191338 A1 Jul. 26, 2012

Related U.S. Application Data

(63) Continuation of application No. 12/967,519, filed on Dec. 14, 2010.

(51) Int. Cl.
*G01C 21/00* (2006.01)
*G06F 19/00* (2006.01)

(52) U.S. Cl. ......... 701/410; 701/411; 701/425; 704/270

(58) Field of Classification Search .................. 701/410, 701/411, 413, 418, 423, 425; 704/270, 275
See application file for complete search history.

(56) References Cited

U.S. PATENT DOCUMENTS 5,369,588 A 11/1994 Hayami et al.
5,504,482 A 4/1996 Schreder
5,610,821 A 3/1997 Gazis et al.
6,427,118 B1 7/2002 Suzuki
6,658,388 B1 * 12/2003 Kleindienst et al. .......... 704/275
7,292,934 B2 11/2007 Wolf
7,298,256 B2 11/2007 Sato et al.
7,695,282 B2 4/2010 Lanktree
7,818,125 B2 10/2010 Hatano et al.
7,840,567 B2 11/2010 Childress et al.

(Continued)

OTHER PUBLICATIONS

Cook, Diane J.; "Decision-Theoretic Cooperative Sensor Planning"; retrieved from University of Texas at Arlington.

(Continued)

*Primary Examiner* — Tan Q Nguyen

(74) *Attorney, Agent, or Firm* — Robert H. Frantz; Libby Z. Toub; Jeff S. LaBaw

(57) ABSTRACT

An enhanced navigation system allowing navigation route and destination planning according to user-specified criteria for the emotion state of persons along the route, at the destination, or both. The enhancement is accomplished by receiving a set of human emotion metrics corresponding to one or more parts of a navigation plan; determining if the human emotion metrics meet one or more user-specified criteria; responsive to not meeting the criteria, determining an alternate navigation plan until the user-specified criteria are met; and responsive to the criteria being met, presenting the navigation plan to the user for laying into a navigation system, and optionally during execution of the navigation plan updating the received human emotion metrics; repeating the determination against the user-specified criteria; and repeating the steps of determining an alternate navigation plan and presentation to a user responsive to the updated human emotion metrics not meeting the user-specified criteria.

15 Claims, 8 Drawing Sheets

U.S. PATENT DOCUMENTS

| | | | | |
|---|---|---|---|---|
| 2006/0085123 | A1 * | 4/2006 | Sugita | 701/211 |
| 2007/0167689 | A1 | 7/2007 | Ramadas et al. | |
| 2008/0052080 | A1 * | 2/2008 | Narayanan | 704/270 |
| 2008/0071466 | A1 | 3/2008 | Downs et al. | |
| 2008/0133131 | A1 | 6/2008 | Poreda et al. | |
| 2010/0036604 | A1 | 2/2010 | O'Connell et al. | |
| 2010/0169003 | A1 | 7/2010 | Van Der Meer | |
| 2011/0118965 | A1 | 5/2011 | Aben et al. | |
| 2012/0035839 | A1 | 2/2012 | Stehle et al. | |

OTHER PUBLICATIONS

Prete, Joseph; "Flexible, Performance-based Route Planning for Super-Dense Operations"; retrieved from AIAA Guidance, Navigation, and Control Conf., Aug. 2008.

Stentz, Anthony; "Optimal and Efficient Path Planning for Partially-Known Environments"; retrieved from The Robotics Institute; Carnegie Mellon University, May 1994.

Harris, Mark; "Emotion sensing robots can tell how you feel"; retrieved from http://www.techradar.com/news/world-of-tech/emotion-sensing-robots-can-tell-how-you-feel-532813 on Oct. 25, 2010.

Techchee; "Japanese weight and emotion sensing furnitures"; retrieved from http://www.techchee.com/2007/07/26/japanese-weight-and-emotion-sensing-furnitures/) on Oct. 25, 2010, Jul. 26, 2007.

Copenhagen Wheel; "The Copenhagen Wheel"; retrieved from http://senseable.mit.edu/copenhagenwheel/ on Oct. 25, 2010.

Campbell, MacGregor; "Robot driving companion brings emotion to navigation"; retrieved from http://www.newscientist.com/article/dn18085-robot-driving-companion-brings-emotion-to-navigation.html on Oct. 25, 2010.

Aida; Affective, Intelligent Driving Agent retrieved from http://senseable.mit.edu/aida/ on Oct. 25, 2010.

Viralheat; "features", retrieved from http://www.viralheat.com/home/features on Dec. 9, 2010.

Inavx; "iNavX™—Marine Navigation App for iPhone, iPod touch and iPad", retrieved from http://www.inavx.com/ on Nov. 15, 2010.

USPTO and French, P.; examination records from related U.S. Appl. No. 12/967,519, filed Dec. 14, 2010, currently under notice of allowance.

USPTO; Examination Correspondence from a Related U.S. Appl. No. 12/967,519, filed Dec. 14, 2010 by Paul B. French.

* cited by examiner 130
133
131
131a
45 kph
134
134a
132a
132a
132
135a
135

140

*Prior Art*

HUMAN EMOTION METRICS FOR NAVIGATION PLANS AND MAPS

CROSS-REFERENCE TO RELATED APPLICATIONS (CLAIMING BENEFIT UNDER 35 U.S.C. 120)

This is a continuation application of U.S. patent application Ser. No. 12/967,519, filed on Dec. 14, 2010, by Paul B. French, et al.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

The invention generally relates to route navigation systems, including stand-alone devices such as Global Positioning System navigations devices, as well as mobile computing platforms equipped with location-based services and applications, such as cellular telephones with navigation applications.

BACKGROUND OF INVENTION

Navigation systems have become prolific in use by private citizens, corporations, government agencies, and military units, in their vehicles, their cellular telephones, and even while walking. Many "stand alone" navigation systems are self-contained in that they contain a battery, a display (often touch-sensitive), an annunciator/speaker, an antenna for receiving a position indication signal, and a processor with firmware for calculating a position, creating a display such as a map with icons, and determining a route with related parameters (length, time in route, estimated time of arrival, etc.).

Some navigation systems are "built-in" to equipment, such as into the dash of a car or truck, or into the instrument panel of an airplane, boat or ship. These units do not often have a separate battery from those of the vehicle in which they are integrated.

Still other navigation systems are specialized, having specific tables of data to assist in specialty navigation, such as systems for use during games or "rounds" of golf which are enhanced to include additional topological data regarding various golf courses, and hunting navigation systems which are enhanced to include specific information useful for hunters such as sunrise-sunset tables, elevation tables, and the like.

And, some navigation systems are parts of other systems, such as a navigation system which is realized by installing an application program onto a location-enabled cellular telephone, the navigation system thereby encompassing the location-determining hardware, display and processor of the telephone, with the application program providing the specialized map generating and route analysis functionality.

Use of such navigation systems saves countless work hours and fuel consumption by providing more efficient driving times, allows emergency responders to save lives by arriving on the scene of an accident or crime faster, and even enhances personal relationships by reducing stress caused during periods of being lost while driving or walking.

SUMMARY OF THE INVENTION

An enhanced navigation system is provided that allows navigation route and destination planning according to user-specified criteria for the emotion state of persons along the route, at the destination, or both. The enhancement is accomplished by receiving a set of human emotion metrics corresponding to one or more parts of a navigation plan; determining if the human emotion metrics meet one or more user-specified criteria; responsive to not meeting the criteria, determining an alternate navigation plan until the user-specified criteria are met; and responsive to the criteria being met, presenting the navigation plan to the user for laying into a navigation system, and optionally during execution of the navigation plan updating the received human emotion metrics; repeating the determination against the user-specified criteria; and repeating the steps of determining an alternate navigation plan and presentation to a user responsive to the updated human emotion metrics not meeting the user-specified criteria.

BRIEF DESCRIPTION OF THE DRAWINGS

The description set forth herein is illustrated by the several drawings.

DETAILED DESCRIPTION OF EMBODIMENT(S) OF THE INVENTION

Figure 1A:
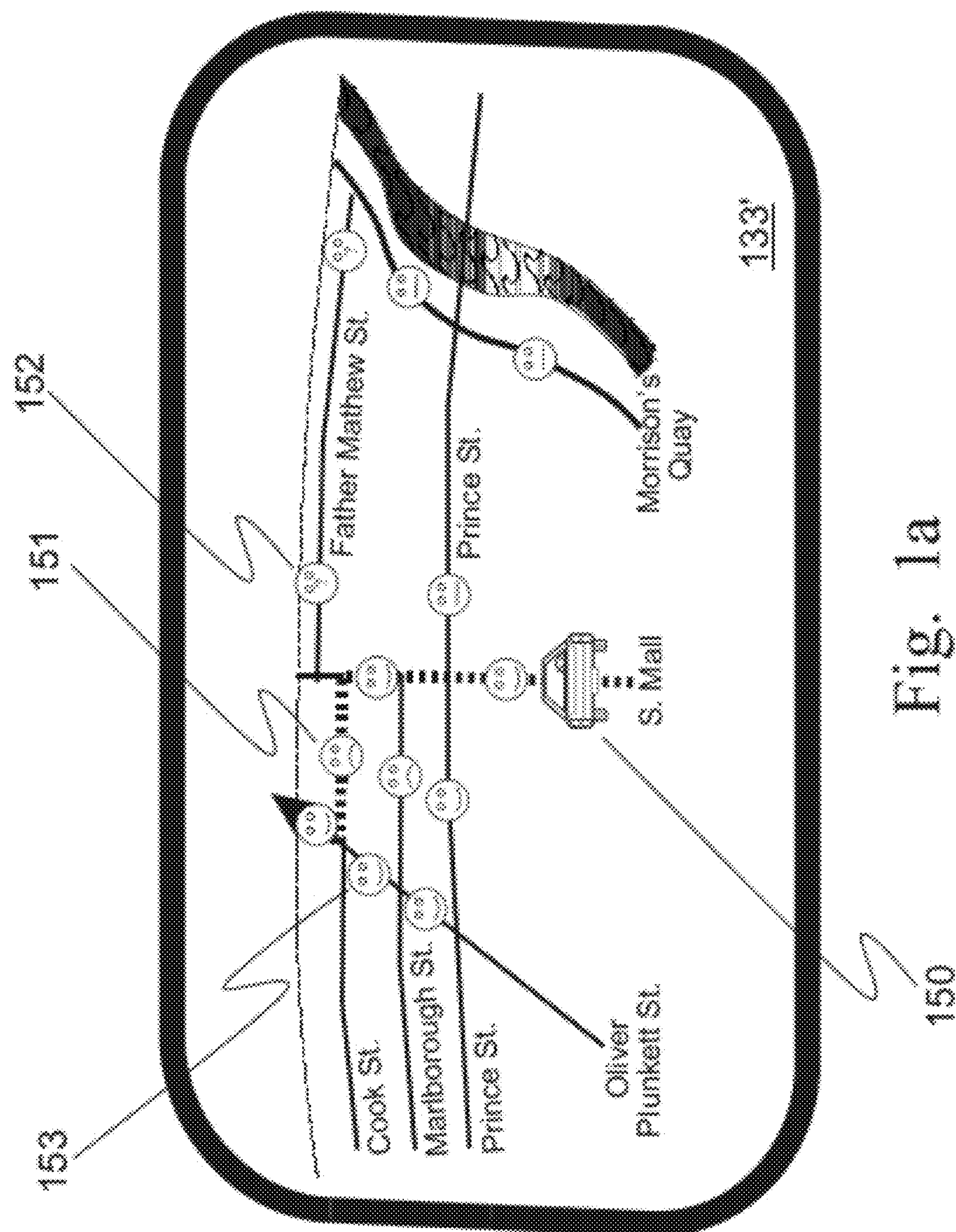
FIG. 1*a* illustrates an enhanced user interface display on a navigation system according to the present invention.

The inventors of the present invention have recognized a problem not previously recognized or addressed by those ordinarily skilled in the art. Some navigation systems are further enhanced to take into account actual navigation data, such as delays, times of travel at specific times and days of the week, and temporary construction, which is reported to the provider of the navigation systems and updated or downloaded to the navigation systems. Downloading can be by wireless network or by connection to a wired network, such as a Universal Serial Bus (USB) connection to a personal computer (PC) which is connected to the Internet.

The route planning and navigation functions of the navigation systems can then take these additional "real world"

factors into account when planning and proposing an actual route from point A to point B at a specific time on a specific day. Additionally, many navigation systems are provided with tables of points of interest (POIs) such as restaurants, clubs, hotels, fuel stations, hospitals, clinics, government buildings, etc., which allow a user to select a destination according to user-supplied parameters, such as picking a restaurant by proximity to the user's current location and by cuisine offered.

Such enhancements are quite useful when (a) the data collected is accurate and fresh, and (b) there are significant variations in a planned route from "normal" or typical conditions (e.g. time or departure or time in route includes a "rush hour" or a section of roadway under construction).

However, as useful as these enhancements may be, there still exists significant events which can cause predicted travel times and delays to be inaccurate, which may lead to the user of the navigation system selecting a proposed route which is not actually optimal. The inventors of the present invention have realized these problems, which do not appear to have been recognized or addressed by those skilled in the art.

For example, imagine you are in a strange city and you are leaving your hotel on foot. You want to walk to a restaurant which is nearby, and you want the restaurant to contain a majority of 'happy' people. Further, you want to take a route which will avoid any areas in which there are 'angry' people, such as protesters or people stuck in traffic. While a present day navigation system may provide a list of close restaurants, and may provide several walking route options from which to select, present day navigation devices do not provide any historical or real-time consideration of any factors such as avoiding people with specific emotion states.

To obtain this type of information using a present day navigation device, you may have to consult with your hotel concierge, who may recommend avoiding walking through the city center or through a major park or plaza because of an ongoing protest at the current time. And, the concierge may recommend one particular restaurant based on the concierge's knowledge of the proposed restaurants. However, if there is no such concierge available, or if his or her knowledge is incomplete or incorrect, the user of the navigation system may not be able to achieve their goal and may find themselves on at a non-preferred route or destination.

Recognizing this problem in the art, the present inventors have proposed certain enhancements to navigation systems which allow the following user experience. Using your navigation-enabled smart phone or your portable navigation device enhanced by the present invention, the user chooses a destination and specifies a set of 'emotion objectives' (i.e. restaurant with happy people along a route devoid of angry people) for the route planning and optimization function of the navigation device. The enhanced navigation device then proposes to the user a prioritized set of routes and destinations based on the emotion-filtered input. If, during the walk, the user's objectives are not longer being met, the enhanced navigation system may receive input from the user to update the route and/or destination choices based on the change in people's emotion along the route or at the destination.

This new enhancement differs from the prior art significantly because current navigation systems take into account such things as time to destination, traffic conditions, etc. in their routing algorithms, but no navigation system takes into account the emotions or other human characteristics of people present on the route(s) or at the destinations(s).

Therefore, the second generation navigation system enabled by the enhancements of the present invention will further improve quality of life; quality of experience, for people on foot, driving, boating, flying, or sailing.

For the purposes of the present disclosure, we will refer to the emotional states of one or more persons along a segment of travel or at a destination as "human emotion metrics", which may include any emotion-related indicator about these persons, such as happy, sad, neutral, angry, frustrated, pleased, content, joyful, sorrowful, fearful, and hateful, for example. Additionally, there is both an aggregate aspect and a temporal aspect to the new process. The aggregate aspect involves determining the aggregate value of the emotion states (according to human emotion metrics) of people along the proposed route(s) or at the proposed destination(s) at a particular time, such as an aggregate value to determine if all people happy now at a destination (e.g. is everyone happy a this club right now?), or an aggregate value to determine if all people were happy at a destination at a past date, day or time (e.g. did everyone enjoy themselves last night at this club?).

The temporal aspect of the present invention involves computing the temporal value of emotion of the same people for a period of time along the route and/or at the destination (e.g. have the people been happy or are they trending to be happier as they moved along a route or while they remained at a destination).

Statistical computations on the aggregate and temporal values may optionally be embodied according to the invention, such as calculating average values human emotion metrics, and standard deviations to indicate or examine the range of human emotion metrics being reported from a travel segment or travel destination. Other calculations, such as derivatives of human emotion metrics over a period of time or across a sample set of people, may be used to determine changes in emotion states on a route or at a destination (first derivative, e.g. what is the difference or change in mood over a period of time or among a set of people), and the rate at which the change is occurring (e.g. is the mood slowly getting better or worse, and is the mood change accelerating?). Any number N of derivatives may be calculated and employed as may be meaningful to interpreting the historical, current, static and dynamic natures of people who are traveling a route, who are at a destination, or both.

In another aspect of potential embodiments according to the present invention, data from environmental sensors along the route(s) or at the destination(s) such as pollution sensors, ambient temperature sensors, and noise level sensors, are received by and used in the route planning and analysis function of a navigation system. These are ancillary to the objectives of the present invention because such conditions can cause people along each route or at each destination to trend towards being happier or sadder.

Alternate Embodiments and Definitions

While the following disclosure will primarily focus on embodiments associated with navigation systems, those ordinarily skilled in the art will recognize that the present invention may well be realized in alternate embodiments with direction servers, such as online map services, as well as in alternate configurations in which the mobile client device receives mapping and/or navigation services from a server.

For this reason, the following disclosure will refer to "user" of the logical process as the recipient of the output of the process, whether that be a portable navigation device, another portable device, a web browser, or another application program.

The inventive process set forth herein also may be applied to just destinations (for those who may not be interested in a route to get to a destination), or to only portions or parts of a route of navigation (e.g. travel segments), or to combinations of destinations, way points, and travel segments.

Enhanced User Interface for Navigation System or Mapping Service

Figure 4:
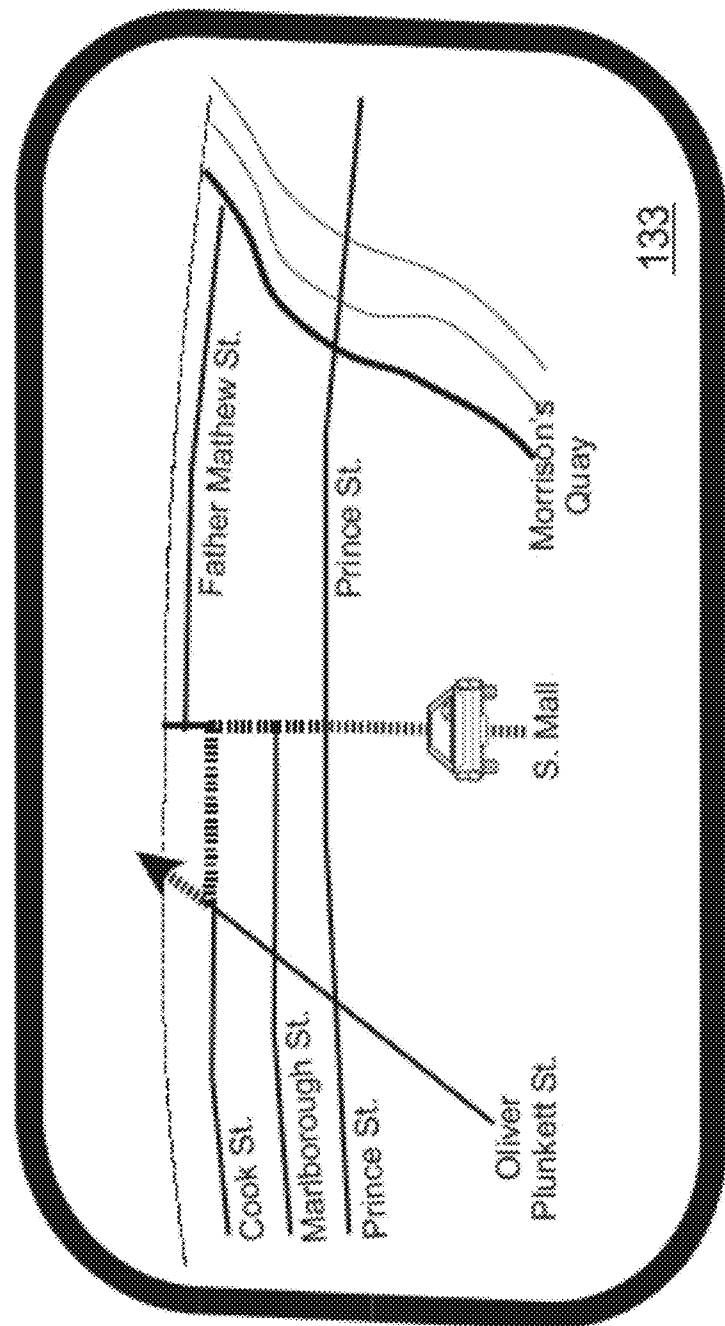
FIG. 4 illustrates a hypothetical navigation display of the well known type.

Turning to FIG. 4, a generalization of a display (133) on a typical navigation system is shown (140). A similar display for a mapping service, except for the vehicle icon, is available, as well (not shown). In this hypothetical example, a user's vehicle (illustrated as the icon of a car) is shown proceeding on S. Mall Street. The planned route (shown in dotted line) will take the user up S. Mall Street until Cook Street, where a left turn will be made, proceeding on Cook Street until Oliver Plunkett Street, where a right turn will be made. Additional turns after this point, if any, are not shown in this three-dimensional type of display format, as they are over the synthetic horizon. As one can tell readily from this illustration, this type of map or display may be shown on any of the variety of navigation systems, including stand-alone, portable, integrated, and cellular-phone-based embodiments. In practice, actual map displays maybe much more detailed, and may make use of color to convey information in a more readily discernable manner. The example of FIG. 4 is presented in a simplified format to conform with drawing requirements for United States patent applications.

Turning now to FIG. 1*a*, an illustration of an enhanced user display (133') using the same route and map as shown in FIG. 4 is provided, except that the display has been enhanced show emotion indicators, or "emoticons", along the current path. In this example, users along the route up S. Mall Street appear to be currently (or historically) happy, but, users along the segment traversing Cook Street do not appear to be currently (or historically) happy (151). Perhaps, at this time of day, there are often delays along this segment of the route. Continuing on the selected route, one can see that users are currently (or historically) happy on the segment of Oliver Plunkett Street.

This enhanced display (133') also shows user emoticons for possible alternative routes and route segments on the other streets, such as Marlborough, Prince, Cook, Father Mathew, and Morrison's Quay streets. In practice, these additional emoticons may not be shown until (a) an unhappy condition is detected along the planned or selected route, or (b) upon user command to display the alternate route emoticons.

Figure 1B:
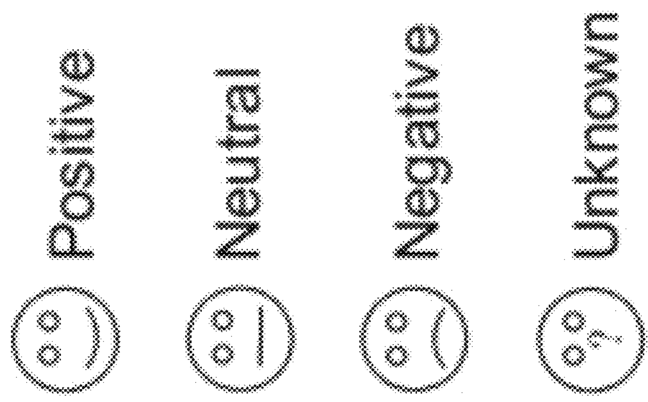
FIG. 1*b* provides a key to the emoticons of FIG. 1*a*.

FIG. 1*b* shows a set of exemplary emoticons, one each for positive user emotions, neutral user emotions, negative user emotions, and unknown (or stale) user emotions.

Figure 1C:
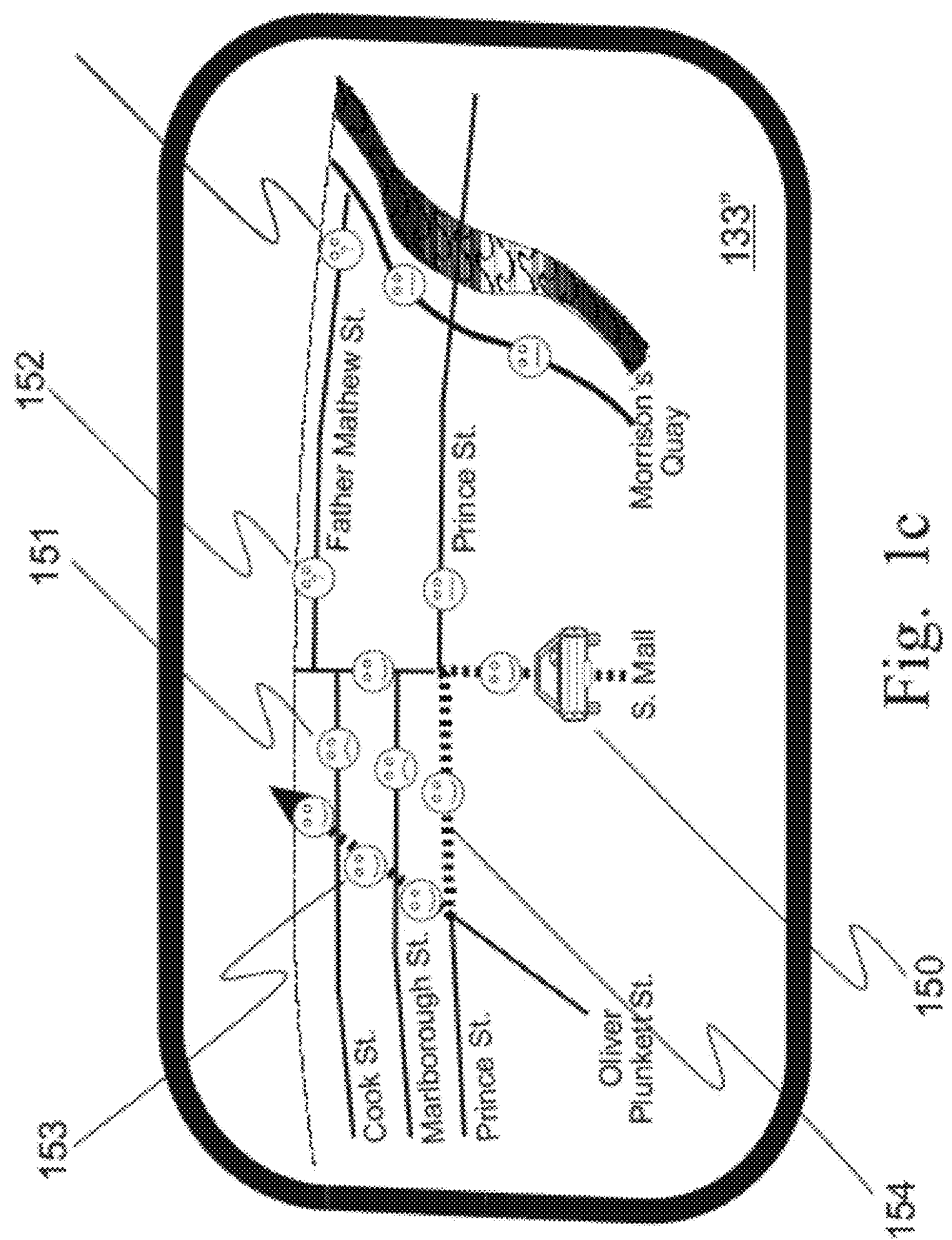
FIG. 1*c* depicts an enhanced user interface display on a navigation system according to the present invention in which an alternate route is selected or laid in, meeting the user's criteria.

FIG. 1*c* illustrates a user display (133") on a navigation device subsequent to performing enhanced route planning an optimization to avoid route segments or destinations where users are currently or historically negative in emotions. In this illustration, a new route (154) has been determined which will proceed up S. Mall Street until Prince Street, turn left at Prince Street and proceed until Oliver Plunkett Street, turning right on Oliver Plunkett Street, and proceeding to the synthetic horizon. As can be readily seen from this example, the user will arrive at the same point as the original route, but the route avoids the segments which are indicated by negative emoticons.

System Description

Having described the produced user interface and operation experience, we now turn to the description of the system components and enhancements to achieve such a new user experience with a navigation system.

Figure 1D:
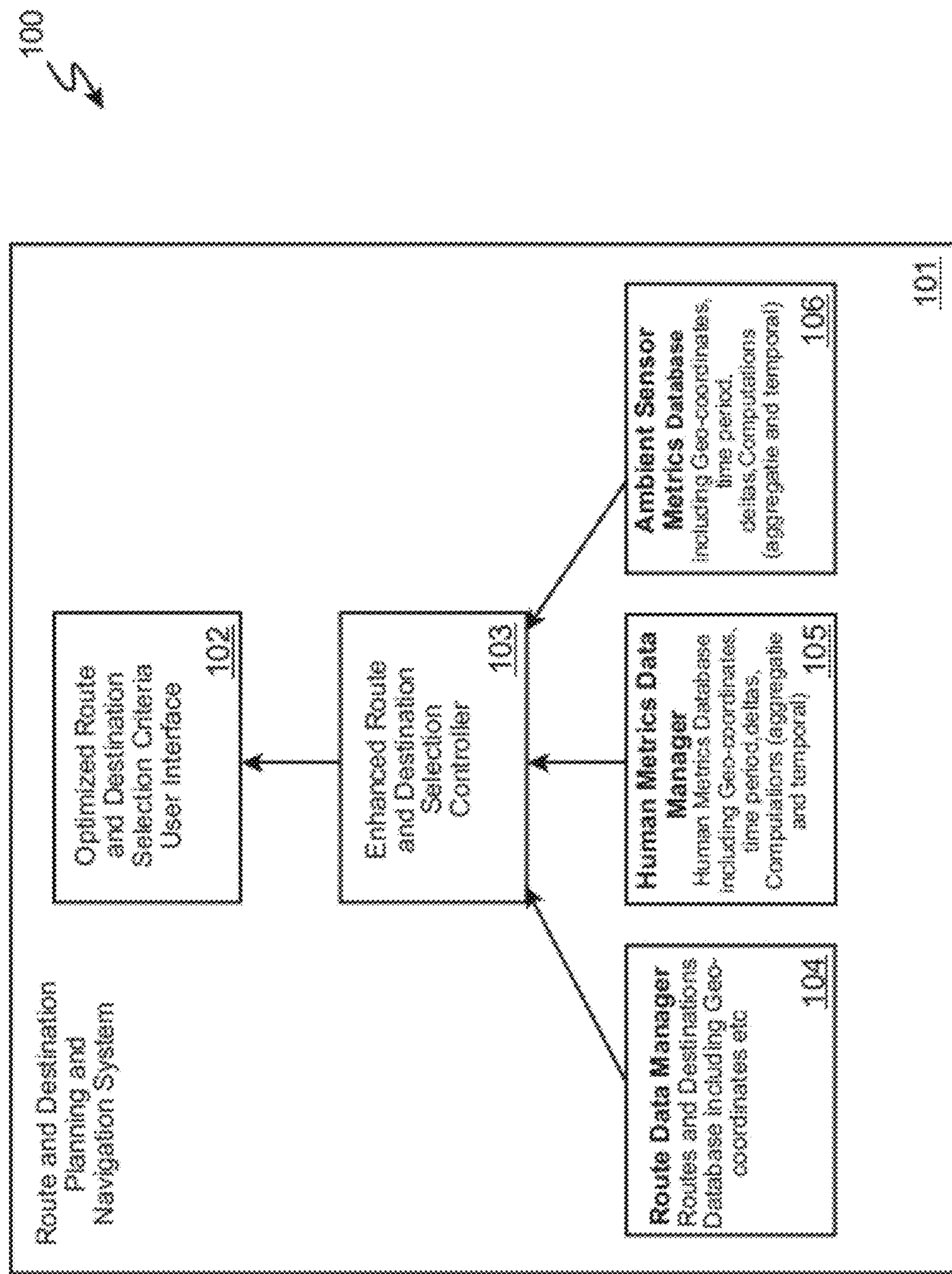
FIG. 1*d* sets forth a system arrangement of components according to the present invention.

Referring now to FIG. 1*d*, a system (100) design according to the present invention is shown, in which the route and destination planning functionality (101) of a navigation system is enhanced to include a human emotion metrics data manager (105), and optionally, an ambient sensor metrics database (106), cooperative with the normal route data manager (104). The route and destination selection controller (1030 is enhanced to receive input from the new human emotion metrics data manager (105) and, optionally, ambient sensor metrics database (106), to be used in enhanced logical processes for selecting destination(s) and determining optimal routes. The user interface (102) is also enhanced to display the necessary user cues such as the emoticons of the previously-described diagrams.

Logical Processes

The following logical processes may be realized as part of embodiments according to the present invention through software or firmware programs added to an existing navigation system or added to an appropriately-capable cellular telephone, or may be implemented in part or whole in customized circuitry.

Figure 3:
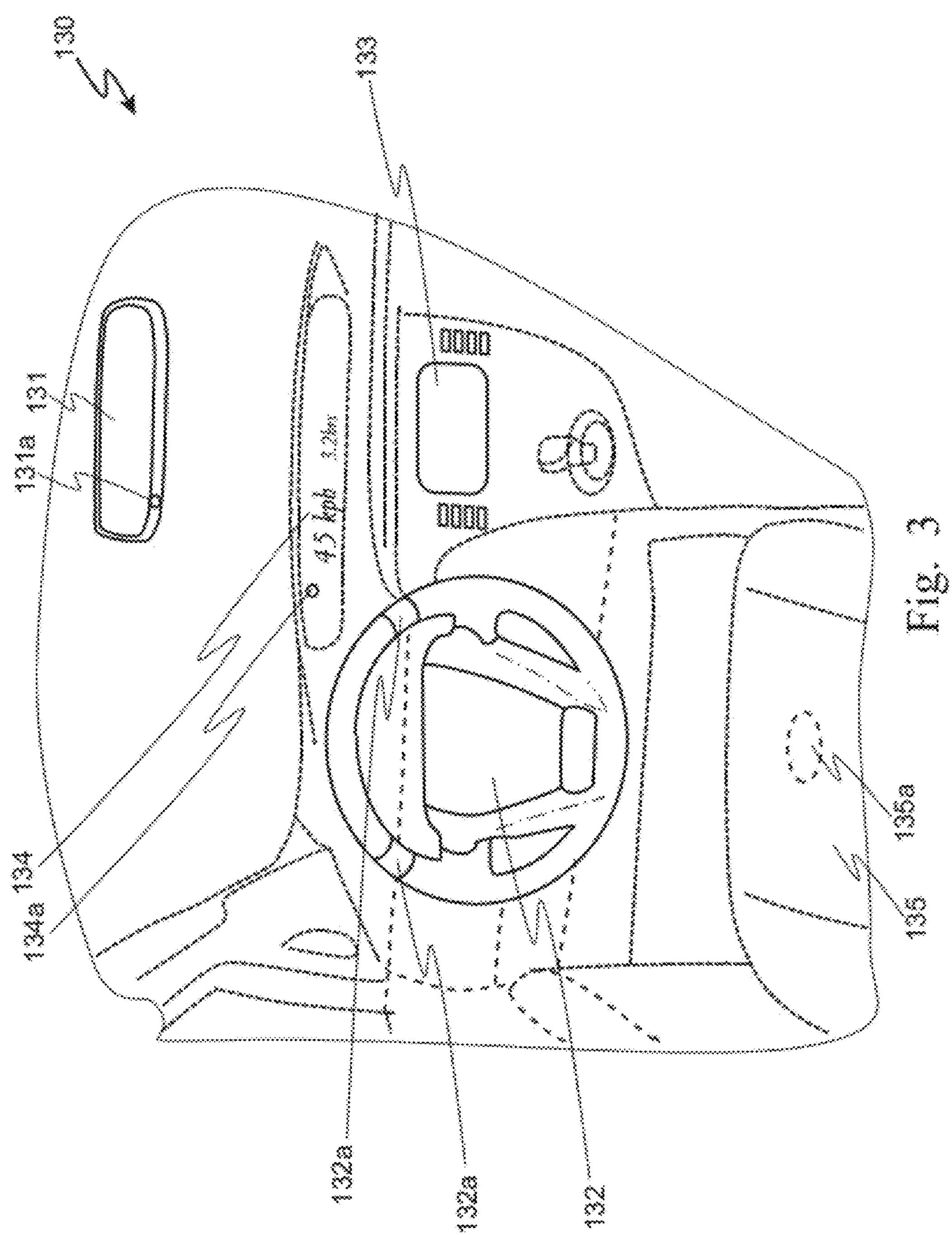
FIG. 3 provides an illustration of several enhancements within the cabin of a vehicle where driver sensors may be place to collect and determine emotion data regarding the driver or user.

User Emotion Metrics. User emotions and sentiment indicators may be received directly from persons at points of interests (POIs) or along segments of travel by some embodiments of the invention, wherein emotion or sentiment analysis is integrated into the same server computer with the logical processes of the present invention. In other embodiments according to the invention, emotion or sentiment analysis may be performed externally to the server computer implementing the present invention. such that human emotion analysis results are received and used by the new logical processes. In one manner of collecting user emotion indicators, persons at POIs or along travel segments may manually input their emotional dispositions (happy, sad, neutral, disappointed, angry, excited, confused, etc.), such as using a mobile phone or laptop computer to register their emotional state on a social web site (e.g. when "checking in", etc.). A social web site sentiment analysis process such as that offered by ViralHeat™ or other suitable processes may then analyze the emotional dispositions of the users, process them according to keywords, phrases, and cluster analysis to generate human emotion metrics for points of interest and segments of travel. The resulting human emotion metrics may then be transmitted to a separate server performing the remaining logical processes of the invention in the case of externally-supplied human emotion metrics, or may be made available in storage memory to the remaining logical processes of the invention in the case of integrated human emotion metrics In another manner of collecting user emotion metrics, sensors may detect and determine the emotion states of persons at a destination, way point, or along a travel segment, and may present those metrics directly to an embodiment according to the present invention or may process them prior to transferring them to an embodiment according to the present invention. For example, FIG. 3 illustrates several proposed and/or readily available driver emotion sensors in a vehicle's cabin (130). For greater understanding of the invention, an example placement of a built-in navigation system's screen (133) his shown in this figure.

The steering wheel (132) may be outfitted with one or more touch sensors (132*a*) which can measure one or more of driver's pulse, driver's grip strength, and driver's body temperature. A sensor (135*a*) placed in the driver's seat (135) may collect similar data. This data can be correlated to a driver's emotion—high temperature or high pulse may indicate unhappy or stressed condition, where lower temperature, lower pulse and lower grip strength may indicate relatively happier or neutral emotions.

A small camera (134*a*, 131*a*) may be placed in the cabin to view the driver's face, such as in the instrument cluster (134) or in the rearview mirror (131). Images from this camera may be analyzed by a processor in the dash, or uploaded to a remote server for remote analysis, to determine likely moods and emotions of the driver, as well.

As previously mentioned, an available source of human emotion metrics, both real-time and historical, is the growing number of "social network" websites in which users upload photos and comments about their activities, such as but not limited to FaceBook™, LinkedIn™, Spoke™, Twitter™, YouTube™, and Flickr™. As previously mentioned, there are presently automated services which can analyze the emotions or sentiments of users of these sites and provide data, statistics, and reports that may be received by certain embodiments of the present invention. For example, in these user's pages, accounts or profiles, a user may upload a photo and a text comment indicating that they are having a great time at a particular restaurant, or alternatively that they are bored or unsatisfied with the food or service. Image analysis may also be performed on the photo to determine the likely emotion status of one or more user's pictured in the image, such as detecting smiles or grimaces on faces in the image. Similarly, users may "update" their social network "pages" while stuck in traffic or delayed on a plane or train, that information also being available to be retrieved and aggregated to generate a historical or current human emotion metrics for that particular destination or route. Further, messaging services may be used to ascertain emotional states of one or more users, such as analyzing messages (SMS, MMS), emails, "tweets", bulletin board postings, and "blog" entries to find keywords and or image indicators of emotional states, and to generate human emotion metrics from this analysis. Advanced embodiments of the present invention may utilize combinations of externally-supplied human emotion metrics and internally-created human emotion metrics, of course, employing any combination of keyword analysis, phrase analysis, cluster analysis, and image analysis on user comments, user annotations, emoticon selections, photographs (still images) and video clips.

Figure 2:
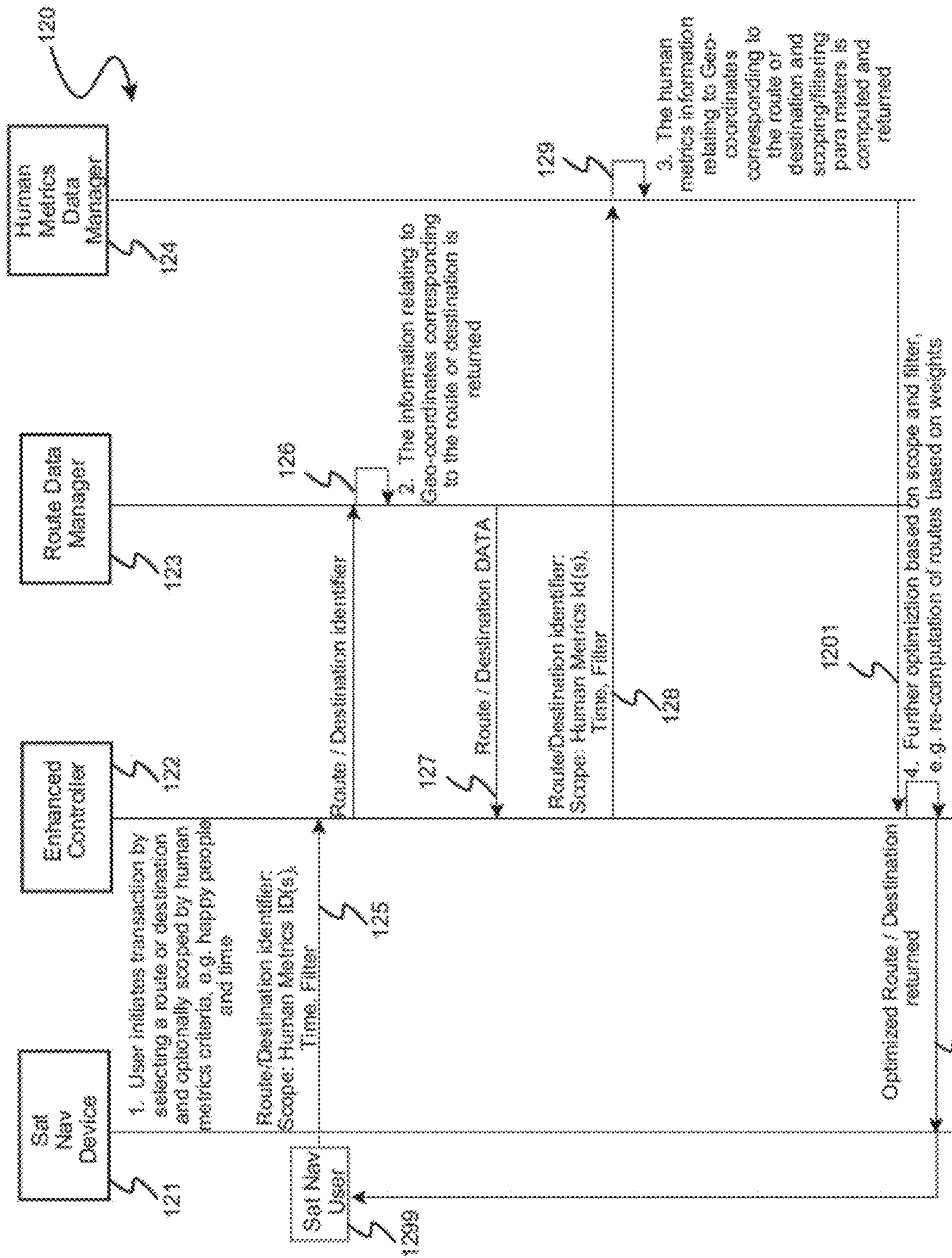
FIG. 2 illustrates a logical process according to the present invention.

Processing of Human Emotion Metric Data. Turning to FIG. 2, the logical handling and analysis of this user data is shown for at least one embodiment according to the present invention. The user (1299) initiates a new route and destination planning operation with the navigation system (121) including providing one or more indications as to preferred emotions of persons along the route, at the destination, or both. The enhanced controller (122) receives (125) this information, including the new user preferences regarding emotion states of users, accesses the route data manager (123) to obtain (126) suitable routes and destinations data (127) which match the user's criteria for the operation. Next, the enhanced controller (122) accesses (128) the new human emotion metrics data manager (124) and optionally the ambient sensor database (not shown) to obtain (129) the current emotion user data, historic emotion data, or both, for points along the available routes, at the available destinations, or both.

Receiving (1201) this human emotion metric data, the enhanced controller (122) then creates an appropriate map annotated by the appropriate human emotion indicators, such as emoticons, and provides (1202) that enhanced map to the user via the user interface of the navigation system (121).

Subsequently, if more than one route met the user's criteria, or more than one destination met the user's criteria, or both, then the user would select a destination, route, or both, and the route and destination would be "laid in" (e.g. locked into the map). After the route and destination are laid in, instructions, such as turn-by-turn instructions, are generated to the user, positions are updated in real time, maps are refreshed, emoticons are refreshed, and the user is directed along the route appropriately.

If, during navigation, newer or fresher human emotion metric data is received (1201), the route and destination analysis may be updated, and if necessary, the user alerted as to a change in conditions. The user may elect to change the selection criteria, the route, the destination, or any combination of criteria, route and destination. After such a change, the process of FIG. 2 would be repeated to select a new route, a new destination, or both.

If during navigation human emotions change to no longer meet the user's preferences, or if during planning of a destination or travel segment no available destinations or travel segments meets or exceeds the user's preferences, a "best fit" solution may be selected. A best fit solution in such a scenario may be determined by considering a degree of correlation between the human emotions and the user's preferences, optionally providing greater weight to certain preferences over others. For the purposes of this disclosure, we will use the term "degree of correlation" to refer to how a human emotion metric compares to a user-specified criterion or preference in degrees, rather than in absolutes, thereby allowing degrees of imprecision and precision, as in fuzzy logic theory. For example, the user may indicate that it is most important to find a restaurant destination where people are "happy" (specified in an absolute domain), and that finding a route where everyone along the route are happy is a lower priority preference. If no restaurants can be found where most diners are "happy" in an absolute sense, then the restaurant with the relatively "happiest" or even the "least sad" patrons may be selected or suggested.

As such, the invention provides a method and system for optimized route and destination selection using the measured or human-input characteristics of users' emotions present on those routes and/or at the destination, consisting of generally:

(a) receiving from a user a destination objective and determine a metric objective;

(b) for at least one route satisfying the destination objective, determining at least one metric associated with the user-supplied metric objective;

(c) responsive to the objectives, determining at least one route where the route metric satisfies the objective; and providing an indication to the user of the route with indications of the human emotion metrics along the route, at the destination, or both.

Using these general steps, the following include but are not limited to examples of the types of applications that can be realized in various embodiments of the invention:

1. An enhanced route planning process and application taking into account the current and/or historical values of the human emotion metrics of people on the routes.
2. An enhanced destination selection process and application taking into account the current and/or historical values of the human emotion metrics of people at the destination.
3. An enhanced "top n" route planning process and application, showing the "top n" routes taking into account the current and/or historical values of the human emotion metrics of people on the routes.
4. An enhanced "top n" destination selection process and application, showing the "top n" destinations, taking into account the current and/or historical values of the human emotion metrics of people at the destination.

Additional Sensor Processing. The additional ambient sensor data (temperature, noise level, pollution, etc.) may be optionally incorporated into the enhancements to the navigation system. As with the human emotion metrics data being received from an external source, so may the ambient sensor data be received from external sources. These additional metrics will be referred to as "ambient metrics" in the remainder of the disclosure. By receiving and using this information in the enhanced route and destination analysis processes according to the invention, the following improvements to navigation systems can be provided to users:

1. An enhanced route planning process and application taking into account the current and/or historical values of the ambient metrics on the routes and/or the combination of these ambient metrics with the human emotion metrics described above (e.g. Pick a quiet route with low pollution).
2. An enhanced destination selection process and application taking into account the current and/or historical values of the ambient metrics at the destination and/or the combination of these ambient metrics with the human emotion metrics described above.
3. An enhanced "top n" route planning process and application, showing the "top n" routes taking into account the current and/or historical values of the ambient metrics along the route and/or the combination of these ambient metrics with the human emotion metrics described above.
4. An enhanced "top n" destination selection process and application, showing the "top n" destinations taking into account the current and/or historical values of the ambient metrics of different people at the destination and/or the combination of these ambient metrics with the human emotion metrics described above.
5. Further enhancements to the route and destination planning are to only use a subset of the human emotion metrics data that correspond to the routes/destinations and time period. The subset can be based on matching the user of the navigation system and the details of the people who are on the route, e.g. based matching their social background and education, living in same area, age group, etc.
6. Further enhancements include giving different weights to the human emotion metrics of people based on different criteria, e.g. give higher weight to people who live in the area, those with <80 mg of alcohol in their blood, etc.
7. Further enhancements exist by combining both the human emotion metrics and ambient metrics to produce higher level metrics representing the 'best' choice.

A Detailed Example Process. An Enhanced Route Selection Criteria process of at least one embodiment according to the present invention comprises a navigation system performing the following steps:

I. Select a destination and set of emotion objectives related to people along the route;

II. Determine the set of geo-coordinates corresponding to the routes (and contained route segments);

III. Determine the time period corresponding to the request (e.g. now=last collection period, etc.);

IV. Retrieve and compute the appropriate human emotion metrics and differences ("deltas") of same related to the geo-coordinates of the routes and route segments and time period determined above;

V. Compute the aggregated values of human emotion metrics and deltas related to the geo-coordinates and time period selected above;

VI. Compute temporal values of human emotion metrics and deltas related to the geo-coordinates and time period selected above;

VII. The set of routes which satisfy the destination and objectives are presented to the user. A User Interface and application to compute and manage route and/or destination selection data to a navigation device user is presented. Sorting, filtering and other mechanisms can be used to allow a user to choose an appropriate route. Pre-determined options, such as those described in the following Use Cases, are also available.

VIII. Data may include but is not limited to:

- A. Destination details: Geo-Coordinates, name
- B. Route Details: Consisting of a set of Route Segments (geo-Coordinates, name)
- C. For each route segment: Time Period: Time Start, Time End
  - 1. Human Values: On a Per-Metrics basis, e.g. Emotion, Noise Level, Movement
    - a) Number of People
    - b) Human value (Happy, Sad, . . . )
    - c) Aggregated (over all users)
      - (1) Overall percentage of time (within time period) at that value (e.g. over the last Time Period 75% (15 of 20 people) were happy)
    - d) Temporal (individual users)
      - (1) Percentage contiguous Time at the value
        - (a) Number of people
        - (b) Percentage
        - (c) Contiguous Time (e.g. over last Time Period 50% (10 of 20 people) were continuously happy for 30 minutes)
      - (2) Percentage of time that value remained or 'improved' over time
        - (a) Number of people
        - (b) Percentage
        - (c) Contiguous Time (e.g. over last Time Period 80% (16 of 20 people) were continuous happy or mood improved for 30 minutes)
      - (3) Similar computations for value 'dis-improved' values An Enhanced Destination Selection Criteria process of at least one embodiment according to the present invention comprises a navigation system performing the following:

I. Select a destination and set of emotion objectives related to people at the destination;

II. Determine the geo-coordinates corresponding to the destination;

III. Determine the time period corresponding to the request (e.g. now=last collection period, etc.);

IV. Retrieve and compute the appropriate human emotion metrics and deltas related to the geo-coordinates and time period determined above;

V. Compute the aggregated values of human emotion metrics and deltas related to the geo-coordinates and time period selected above;

VI. Compute temporal values of human emotion metrics and deltas related to the geo-coordinates and time period selected above;

VII. The set of routes to the destination which satisfy the objectives are presented. A User Interface and application to compute and manage destination selection data to a navigation system user is presented. Sorting, filtering and other mechanisms can be used to allow a user to choose an appropriate destination. Predetermined options, such as those described in the following Use Cases, are also available.

VIII. Data may include but is not limited to:

1. Route Details: Consisting of a set of Route Segments (geo-coordinates, name)
2. Destination details: Geo-Coordinates, name
3. Time Period: Time Start, Time End
4. Total Number of People at destination 5. Human Values: On a Per-Metrics basis, e.g. Emotion, Noise Level, Movement
   a) Number of People
   b) Human value (Happy, Sad, . . . )
   c) Aggregated (over all users)
      (1) Overall percentage of time (within time period) at that value (e.g. over the last Time Period 75% (15 of 20 people) were happy)
   d) Temporal (individual users)
      (1) Percentage contiguous Time at the value
         (a) Number of people
         (b) Percentage
         (c) Contiguous Time (e.g. over last Time Period 50% (10 of 20 people) were continuously happy for 30 minutes)
      (2) Percentage of time that value remained or 'improved' over time
         (a) Number of people
         (b) Percentage
         (c) Contiguous Time (e.g. over last Time Period 80% (16 of 20 people) were continuous happy or mood improved for 30 minutes)
      (3) Similar computations for value 'dis-improved' values Detailed Examples of Use of Enhanced Navigation Systems. The following, more detailed examples of how to use an enhanced navigation system, or alternatively mapping service, according to the invention are presented in the following paragraphs for further illustration of the invention and its benefits. Such examples of use should not be construed to be limitations on the logical process embodiments of the invention, nor should variations of user interface methods from those described herein be considered outside the scope of the present invention.

Route Planner Use Case. The user turns on the navigation system and enters "Route Planner" application, typing in a specific destination (restaurant by name, hotel by name, specific address, etc.) or entering destination search criteria (restaurant, hotel, nearby, near POI, etc.).

The Enhanced Route Planner presents to the user a set of predetermined Options relating to human emotion metrics. These can be specified on an aggregate basis (i.e. aggregate values of human emotion metrics of all people along the route), such as select a route based on avoiding areas where people are or were angry, unhappy, anxious, etc., along the route to the destination, or select a route based on selecting areas where people are or were happy, calm, etc., along the route, for example. Or, these human emotion metric criteria may be specified on a temporal basis (i.e. values of human emotion metrics of the same people who are or have traveled along the route (i.e. did they enjoy the route)), such as to select a route based on avoiding areas where people were consistently angry, unhappy, anxious, or who got more angry (delta) along the route, or to select a route based on selecting areas where people were consistently happy, calm or noisy, or who got progressively happier along the route.

The Route Planner process also presents the set of routes available and a list of aggregate or temporal values of human emotion metrics to the user, such as a table of route options with human (and optional ambient) metrics. This table may be sorted and filtered appropriately to give the top n routes based on certain human emotion metrics, e.g. happiest first. This table may also display metrics currently known to the art, e.g. time to destination, etc. Users will be able to use sorting and filtering to manage the list of routes.

Destination Planner Use Case. Similar processes as described above in the Route Planner Use Case can also be realized where the user is offered the ability to choose a destination, e.g. restaurant, pub, based on these human emotion metrics (and optionally based on ambient sensor metrics).

As will be readily recognized by those skilled in the art, route planning and destination planning aspects of the invention may be realized and used separately or in combination with each other without departing from the spirit and scope of the invention.

Suitable Computing Platform

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 5:
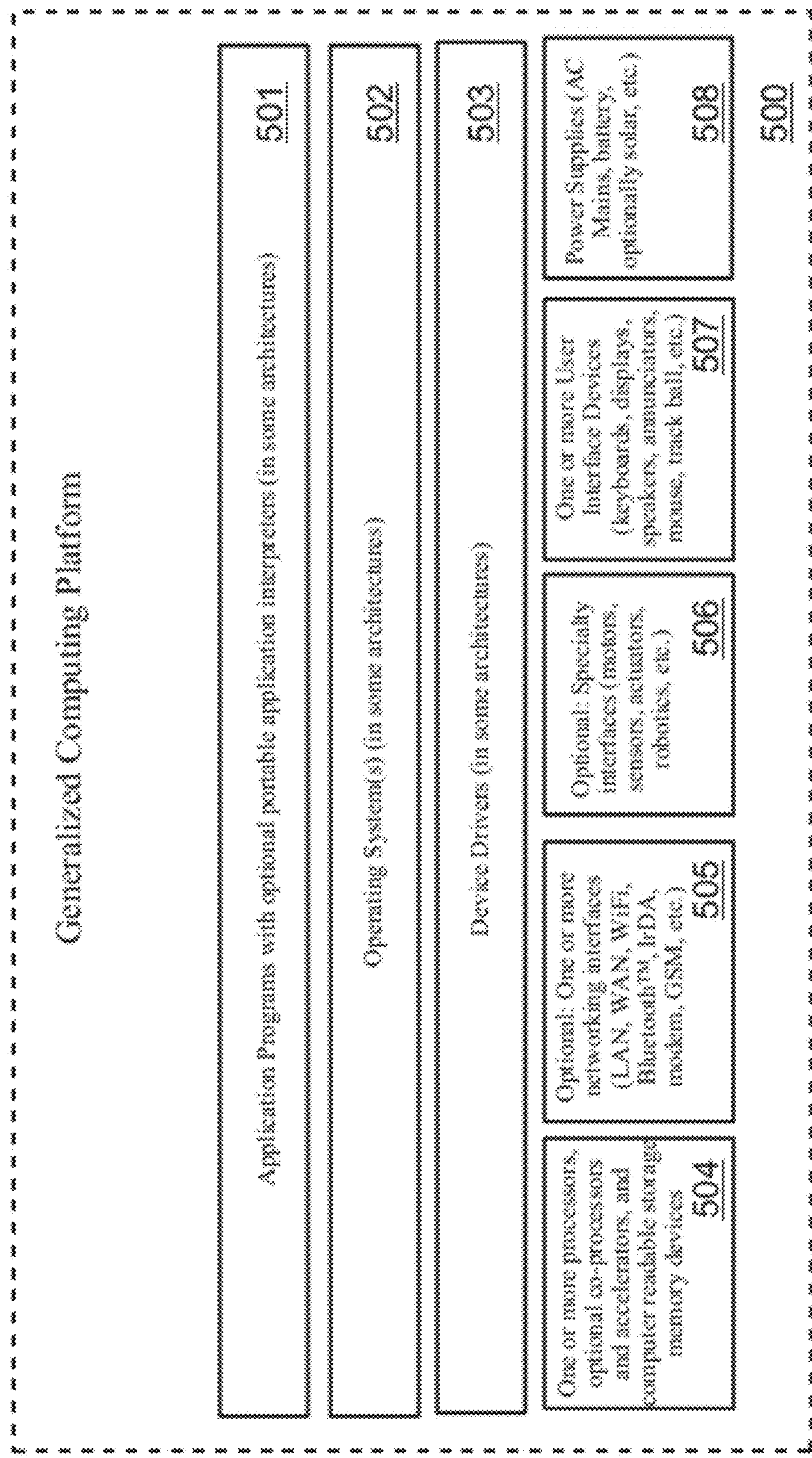
FIG. 5 sets forth a generalized architecture of computing platforms suitable for at least one embodiment of the present invention.

The present invention may be realized for many different processors used in many different computing platforms. FIG. 5 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A computer-implemented method for enhanced navigation route and destination planning comprising:

receiving by a computer a first human emotion metric corresponding to a travel destination or to a travel segment;

comparing by the computer the received human emotion metric to a user-specified criterion to determine a degree of correlation between the destination or segment and a user preference; and providing by the computer an indication to a user of acceptability or unacceptability of the travel destination or travel segment according to the degree of correlation.

2. The method as set forth in claim 1 wherein the human emotion metric is received from at least one source selected from a group consisting of a user's mobile device, a social web site server, a human emotion metrics aggregation server, a separate application program, a separate server, and an emotion sensor.

3. The method as set forth in claim 1 wherein the user comprises a device selected from a group consisting of an on-board vehicle navigation system, a portable navigation system, an application program, and a directions server.

4. The method as set forth in claim 1 further comprising, subsequent to initially providing an indication to a user of acceptability or unacceptability of the travel destination or travel segment according to the degree of correlation, repeating the receiving, comparing and indicating of acceptability or unacceptability responsive to a change in the first human emotion metric.

5. The method as set forth in claim 1 further comprising, subsequent to initially providing an indication to a user of acceptability or unacceptability of the travel destination or travel segment according to the degree of correlation, performing the receiving, comparing and indicating of acceptability or unacceptability responsive to receipt of a second human emotion metric corresponding to a travel destination or to a travel segment.

6. The method as set forth in claim 5 wherein the second human emotion metric corresponds to a different travel destination or to a different travel segment than the first human emotion metric.

7. The method as set forth in claim 1 wherein the human emotion metric corresponds to a temporal metric determined by computing a value of human emotion metric of a set of human emotion metrics for people for a period of time, wherein the set consists of human emotion metrics for the same people traveling along the travel segment for the period of time, human emotion metrics for people being at the at the travel destination for the period of time, or both human emotion metrics for people traveling along the travel segment and human emotion metrics for people being at the travel destination for the period of time.

8. The method as set forth in claim 7 wherein the computing comprises computing a difference value between the value of the human emotion metrics for the same people upon beginning traveling along the travel segment and the value of the human emotion metrics for the same people upon ending traveling along the travel segment.

9. The method as set forth in claim 7 wherein the computing comprises computing a difference value between the value of the human emotion metrics for the same people upon arriving at the travel destination and the value of the human emotion metric for the same people at a time after remaining at the travel destination.

10. The method as set forth in claim 1 wherein the human emotion metric corresponds to an aggregate metric determined by computing a current aggregate value of the human emotion metric of a plurality of people selected from a group consisting of human emotion metrics from people who have previously traveled along the travel segment, human emotion metrics from people who are currently traveling along the travel segment, human emotion metrics from people who have visited the travel destination, and human emotion metrics from people who are currently at the travel destination.

11. The method as set forth in claim 10 wherein the indicator is an emoticon display.

12. The method as set forth in claim 10 wherein the display comprises a display selected from a group consisting of a list of travel destinations, a list of travel segments, and a map.

13. The method as set forth in claim 1 wherein the aggregate metric is selected from a group consisting of an average, a standard deviation, and an n-th derivative.

14. The method as set forth in claim 1 wherein the receiving, comparing, and providing an indication of acceptability or unacceptability further comprises receiving and comparing at least one ambient metric, and wherein the user-specified criteria further comprise at least one ambient criteria.

15. The method as set forth in claim 1 wherein the providing of the indication of acceptability or unacceptability comprises presenting an indicator associated with the travel destination or with the travel segment on a display to a human user.

* * * * *